United States Patent [19]

Sonnenschein et al.

[11] Patent Number: 4,975,358

[45] Date of Patent: Dec. 4, 1990

[54] IMMEDIATE WRITE, READ, AND ERASE OPTICAL STORAGE MEDIUM AND METHOD OF MARKING AND ERASING

[75] Inventors: Mark F. Sonnenschein, Arlington, Va.; Charles M. Roland, Waldorf, Md.

[73] Assignee: The United States of America as represented by the Secretary of the Navy, Washington, D.C.

[21] Appl. No.: 422,723

[22] Filed: Oct. 17, 1989

[51] Int. Cl.$^5$ .................. G03C 1/00; G03C 1/492; B32B 3/02; G01D 9/00
[52] U.S. Cl. .................. 430/495; 430/270; 430/271; 430/273; 430/945; 428/64; 346/135.1
[58] Field of Search ............ 430/495, 945, 270, 271, 430/273

[56] References Cited

U.S. PATENT DOCUMENTS

| | | | |
|---|---|---|---|
| 4,486,463 | 12/1984 | Rubner et al. | 427/53.1 |
| 4,656,121 | 4/1987 | Sato et al. | 430/495 |
| 4,766,021 | 8/1988 | Werner et al. | 428/64 |

OTHER PUBLICATIONS

Pearson, "Polymeric Optical Disk Recording Media", CRC Critical Reviews in Solid State & Materials Sciences, 13(1), pp. 1–26 (1986).
Novotny et al., J. Appl. Phys., 50(3), pp. 1215–1221, Mar. 1979.
Andrew et al., Appl. Phys. Lett., 43(8), pp. 717–719, Oct. 15, 1983.
Srinivasan et al., J. Polymer Science Chemistry Edition, 22, pp. 2601–2609, 1984.
Fang et al., Polymer Engineering & Science, vol. 29, No. 18, pp. 1241–1245, Sep. 1989.

*Primary Examiner*—Paul R. Michl
*Assistant Examiner*—Ashley I. Pezzner
*Attorney, Agent, or Firm*—Thomas E. McDonnell; A. Davis Spevack

[57] ABSTRACT

An optical data storage medium comprises a substrate layer, a recording medium and an optional protective layer. The substrate layer supports the recording medium. The recording medium comprises a polymer having stable amorphous and crystalline states under human operating conditions which states have different optical properties. The recording medium is optionally covered and protected by a protective layer. The substrate, recording medium and protective layer can be formed from the same or different polymers. The data is stored by exposing the recording medium to patterned infra-red radiation. The radiation can be patterned by a mask, movement of the radiation beam or by other means to imprint the data on the recording medium.

29 Claims, 2 Drawing Sheets

IMMEDIATE WRITE, READ, AND ERASE OPTICAL STORAGE MEDIUM AND METHOD OF MARKING AND ERASING

BACKGROUND OF THE INVENTION

1. Field of the Invention

This invention relates to a substantially instantaneously reacting polymeric optical storage medium and the method of marking and erasing the medium.

2. Description of the Prior Art

Today, we are in an information age. There is an increasing need to record, modify and manipulate information. The volume of information being processed demands a medium with a large capacity for recording and preserving information. At least two types of medium are needed. One, a medium which will record information permanently providing unlimited playback potential, and the other, a medium which will provide the ability to flexibly record and erase. It is preferred that the write and erase medium make the information instantly available.

Optical techniques provide excellent information storage and use capabilities. From the advent of the video disc to the more recent explosion of the compact recording disc, optical information storage provides a means of recording and replaying a vast amount of information with high fidelity and reproducibility. The optical storage medium couples well with digital recording techniques. Digital information is easily translated into the images or marks recorded and read from an optical storage medium.

Pearson, in an article titled "Polymeric Optical Disk Recording Media", *CRC Critical Reviews in Solid State and Material Science*, Vol. 13, pp. 1-26 at page 1 (1986) stated "High-Speed, instantaneous optical recordings by use of a laser is finally emerging from the laboratory as a powerful new technology for information storage. The technique offers the capability for low-cost-high-capacity data storage with rapid, random-access retrieval."

As the demand increases for improved techniques for both permanently writing data and for writing/erasing data, the search continues for materials which can alternately provide permanent recording (RAM) capabilities and materials which can provide write and erase capabilities. Polymeric optical disks are emerging as one of the leading candidates for such a recording medium.

The Pearson article infra excellently summarizes the state-of-the-art in the field and presents the criteria for an acceptable medium including:

(1) High-marking sensitivity at an appropriate wavelength coupled with long-term stability of the recording medium and the recorded information;
(2) High signal-to-noise ratio (SNR) of the recorded information to facilitate data retrieval;
(3) Low defect density level to minimize errors;
(4) Substantially instantaneous readability (microseconds) following the marking event (direct read after write [Draw]). This eliminates materials requiring post image processing or slow image development.

A vast number of polymers and modified polymers to meet these criteria have been suggested, but a fully satisfactory solution has not been found.

An optical reading system usually comprises a means of projecting light at the recorded surface and a means of detecting the reflections from the surface. The data stored for optical reading must be marked onto the storage medium in such a way that the reading light projected at the surface can be varied or broken up to cause changes in signal corresponding to the nature of the data.

Basically, there are four types of changes in the surface character used with polymeric optical disks. The first is to form a shallow pit. The second is to form a deep pit. The third is to form a blister and the fourth changes the optical but not the chemical characteristics of the surface.

The first three methods usually permanently deform the surface. In two of these ("ablative techniques"), material is either displaced or moved to the side by localized heating of the material. In the case of the deep pit, material is literally blasted out or removed from the localized area.

In the blistering technique a bubble or bump is formed in the material itself or at the interface of a sandwich or composite of material. These techniques are usually Read-Only (ROM) techniques. The fourth technique changes the optical characteristics of a localized area. This may be done by havin dyes embedded in the polymers which dyes will convert between an amorphous and a crystalline state causing a change in the color or clarity of the polymer. Pearson, infra at page 16, describes the use of dyes in write/erase systems.

It has been suggested that dyes can be used in polystyrene oligomer to form a write/erase medium. This system is an ablative system in which a pitted surface can be regenerated to a smooth surface by heating the polymer. Of course, a little material is lost in each cycle so the number of repetitions is limited to the point where a hole is driven through the recording medium. These techniques are described by Pearson, infra, at pages 16 and 17.

Phase change has been shown in the literature for several of the different techniques. In some cases a polymer is heated rapidly to vaporize some component of the polymer film, forming a bubble. These bubbles may or may not be partially crystalline; the crucial feature is that the bubble material be rigid in order to stabilize the bubble. Materials used in this approach are polymethylmethacrylate (a non-crystallizing polymer), polymethylstyrene, and polycarbonate. Illustrative of these techniques are U.S. Pat. No. 4,360,895 (1982) to Cornet and European patent No. 58,496 to Maffit, Robbins, and Wilson (1982). An optical data storage system described by Willis in U.S. Pat. No. 4,264,986 employs a similar concept but adds the erase feature. Images can be erased by heating the rigid bubble to a high temperature, whereby the resilience of the material allows it to contract, followed by rapid quenching of the polymer back to a rigid state. A similar approach is described by Lind et al. in U.S. Pat. Nos. 4,780,867 and 4,719,615.

Another phase change recording layer is disclosed in Japanese Patent No. 58-199,345 to Ota, K. (1984). The active medium consists of a transition metal diketonate dispersed in a polymer matrix. Within the polymer, light sensitive domains comprised of the metal diketonate can be converted from the amorphous to the crystalline state with a pulsed $N_2$ laser. The image formed can be erased by heating.

Small molecule (i.e., non-polymeric) inorganic materials such as oxides of tellurium (Takenaga et al., *J. Appl. Phys.*, 54, p. 5376, (1983)), alloys of GeTe, SeTe, and ternary alloys such as varying ratios of TeGeSb (Ovshinsky and Fritzsche, *IEEE Transactions on Electron Devices*, 20, p. 91, (1973)) are capable of being switched from the amorphous to crystalline state by application of a short pulse of electricity or light. These non polymeric materials can be repeatedly cycled. This work is further developed in 133 patents issued to S. R. Ovshinsky. These are exemplified by U.S. Pat. Nos. 4,226,898, and 4,217,374.

There are many patents and articles which describe ablative techniques. Novotny and Alexandru, *J. Appl. Polymer Science*, Vol 24, pp. 1321–1328 (1979), describe a dye-polymer system based on the thermal diffusion of the dye into a PET (Mylar) film substrate following exposure to 1 microsecond of 32 milliwatt 5145 (angstrom) radiation. The small dye spots, whose spatial profile is similar to that of the exciting beam, can then be read by a variety of means. Murthy, Klingensmith, and Michl, *J. Appl. Poly. Sci.*, 31p. 2331, (1986), describe a method of optical data storage that involves exposure of deformed (stretched) poly(vinyl chloride)-dye films to laser radiation at 823 nm. The heating caused a loss of film birefringence which can be detected in a variety of means.

Lind et al. in U.S. Pat. No. 4,780,867 describes an optical recording mechanism whereby an initially amorphous polymer (an expansion layer) is adhered to a substrate (a retention layer). Bubble formation creates a localized deformation. This deformation can then be erased by reheating the polymer expansion layer and using the shear deformation induced by its attachment to the retention layer to "pull" the surface smooth. A similar disclosure appears in U.S. Pat. No. 4,719,615 by the same assignee.

The marking of polymer films with three dimensional resolution is described in the patent literature of photoresist technology. Recent reviews of this field include: C. G. Willson and M. J. Bowden in *Electronic and Photonic Applications of Polymers*, Adv. Chem. Ser., American Chemical Society, Vol. 218, 1988, Chapter 2; *Symposium on Polymers in Information Storage Technology*, Polymer Preprints, Vol. 29, p. 195, 1988; *Symposium on Polymers in Microlithography*, Polymeric Materials: Science and Engineering, Vol. 60, p. 40 1989. These processes differ from optical data recording because:

they have a chemical development step in the production of an image;

the materials used are not commercially available and inexpensive;

they are constrained to a particular wavelength;

the theoretical resolution is less than 1000 Å and the demonstrated resolution is less than 10,000 Å (1 $\mu$);

The lithography art has utilized differences in reactivity on a polymer surface created by exposure of a polymer to heat to "process" an image. Rubner, in U.S. Pat. No. 4,486,463, describes a process for the selective metal plating of RYTON ®, a clay filled poly[phenylene sulfide] sold by Phillips, substrates by exposing the polymer surface through a mask to heat generated by a $CO_2$ laser. An image is generated which is then made hydrophilic, catalyzed, doped to deactivate catalyst in certain regions and selectively metal plated by electroless plating. Rubner utilizes the change in state of Ryton from amorphous to crystalline to create regions in which the dopant is excluded in order to form the image. RYTON ® does not provide sharp images because the laser generated heat is rapidly and efficiently dissipated to the surrounding polymer.

Image storage via ablation of polyethylene is described by Kudner et al., *J. Appl. Polym. Sci*, 35, p. 1257 (1988). Kudner exposes prepared film to intense radiation from a HeNe laser resulting in 10 micron holes. Bell describes forming high resolution pits in inorganic layers of $Ti/MgF_2/Al$, Bell, *A. E. J. Appl. Phys*, 53, p. 3438 (1982). Howe and Wrobel., *J. Vac. Sci. Technol.*, 18, p. 92, (1981), describes the use of laser induced ablation in dye-polymer-Al structures.

There is a preference in the optical data storage field to use short wave lengths in the UV or far UV range because of the belief that these wave lengths are necessary to obtain sharp images. The belief is that the size of the image can't be less than the wave length of the radiation used to imprint. The reasons for this preference are explained by Iwayanagi et al., "*Materials and Processes for Deep-UV Lithography*", *Electronic and Photonic Applications of Polymers*, Adv. Chem. Ser., American Chemical Society, Vol. 218, 1988, Chapter 3, at pages 109–110. Srinivasan et al., *Appl. Phys.*, 41, No. 6, pp. 576–578, 15 Sept. 1982, exemplifies the use of UV to form an image. In addition, in U.S. Pat. No. 4,417,948, Srinivasan and Mayne-Banton describe a deep ultra-violet wavelength technique for photo marking polyester films (including PET) which is reported to work in reactive or inert atmospheres. These are ablative techniques based on photoetching techniques.

Andrew et al. in an article titled "Direct Etching of Polymeric Materials Using a XeCl Laser", *Appl. Phys. Lett.*, 43(8), pp. 717–719, 15 Oct. 1983, suggests that the UV etching in PET "is primarily due to a thermal process." (at page 717). As proof, Andrew et al. states "It is relevant to note that consistent with the proposed thermal model a similar structure to that in FIG. 2 was revealed by "etching" using a 30-ns TEA $CO_2$ laser tuned to a strong absorption band in PET. The excimer laser is thus not unique in its ability to etch and reveal microstructure but has the advantages of short penetration depth, short pulse length, and a low threshold fluence which allows very controllable material removal." Andrew et al. at page 719.

E. O. Chiello, F. Garbassi, and V. Malatesta, *Appl. Macromolecular Chem. and Physics*, 169, p. 143, (1989) describe using a $CO_2$ laser to irradiate what are initially opaque PEEK films (0.25 mm thick). The irradiation causes hole formation (>30s at 100 W) or surface disruption by deformation and melting (<20s at 10 W). In the latter case, the deformation resulted in "the only relevant feature is some corrugation of the surface, probably due to microfusion events". The authors noted that the low power irradiation caused melting and that upon turning off the laser "the polymer remained deformed, but the treated zone required (sic) the original opaque appearance."

Bowden et al., on page 66 in *Electronic and Photonic Applications of Polymers*, Adv. Chem. Ser., Vol. 218, edited by M. J. Bowden, (1988) and S. R. Turner, describe an erasable optical storage technique consisting of a dye containing elastomeric layer containing a dye sensitive to 8400 Å radiation in contact with a plastic layer containing a dye sensitive to 7800 Å radiation. When the rubbery layer is heated by 8400 Å light, it expands and deforms the plastic retention layer. This deformation is the image (surface bump) that serves as the digital datum. When 7800 Å light is projected on the medium, the die within the plastic layer absorbs and thus heats up the plastic. It elastically recovers, whereby the surface bump disappears.

An optical recording medium that provides substantially instantaneous write and erase capabilities is needed. The medium should be stable under temperature conditions usually experienced by humans and the medium should be capable of millions of write/erase cycles without substantial loss of clarity.

SUMMARY OF THE INVENTION

Accordingly, an object of this invention is a write/erase optical data storage medium.

Another object of the invention is an instant reading optical data storage medium.

A further object of the invention is an optical data storage medium which is stable and capable of retaining data under conventional operating conditions.

Yet another object of this invention is an optical data storage medium capable of producing sharply defined, high resolution images. For many of the anticipated applications, this resolution should be at least $1\mu$.

An additional object of this invention is an erasable method of writing on the recording medium utilizing the reversible phase state of certain polymers between their crystalline and amorphous phases.

These and additional objects of the invention are accomplished by an optical data storage medium comprising a substate layer, a recording medium and an optional protective layer. The substrate layer supports the recording medium. The recording medium comprises a polymer having stable amorphous and crystalline states under human operating conditions which states have different optical properties. The recording medium is optionally covered and protected by a protective layer. The substrate, recording medium and protective layer can be formed from the same or different polymers. The data is stored by exposing the recording medium to patterned infra-red radiation. The radiation can be patterned by a mask, movement of the radiation beam or by other means to imprint the data on the recording medium.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

This invention pertains to erasable recording and storage media and the method of writing and erasing on those media. A medium records high resolution digital information in the form of images or marks in or on a polymeric matrix. The method of imprinting and erasing and the optical storage medium of this invention takes advantage of a laser induced phase transition in the recording medium.

Figure 1:
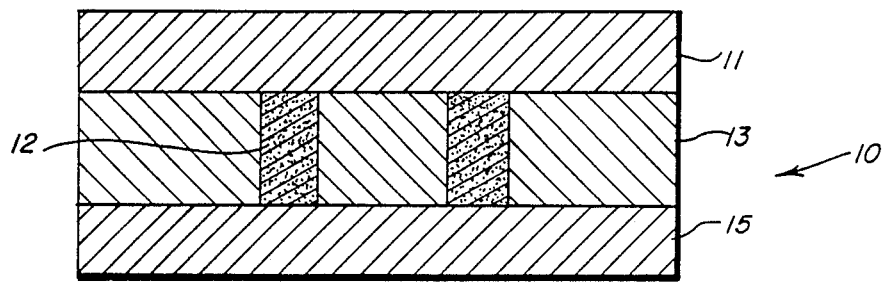
FIG. 1 is a sectional view of an optical storage medium.

Optical storage medium refers to an assembly, 10, such as is illustrated in FIG. 1 which comprises a substrate 15 to mount a recording medium 13. A protective layer, 11 overlies the recording medium 13 protecting it from damage. Heat causes a localized phase change in the recording medium 13 producing an image or mark 12.

The general form of the assembly, 10, is the structure commonly used for optical storage disks such as those commonly known as CD's. The substrate is any substrate used to give body to the assembly, including simply in one embodiment the polymeric recording medium itself in the form of a relatively thicker film which will not fold or crinkle to change the image.

The protective layer 11 is an optically clear layer which has sufficient hardness to reduce or eliminate scratches and provide an optically clear transmission medium. The protective layer could be any of the polymers now used or that will be used on optical storage discs. These latter include materials comprising the recording medium herein; accordingly, a simplified construction can be attained. The protective layer must be optically clear and relatively hard. When formed from a different polymer that the recording medium, the protective layer should be non-optically reactive to heat under the conditions which mark and erase the recording medium. In cases where the recording medium forms the protective layer, the laser can be "focused" to "write" at a depth below the medium surface.

The optical storage medium does not have to be on a firm or rigid substrate in the form of a disc. Any substrate will be suitable which will protect the recording medium from extraneous folds or creases is sufficient. Video tape structures, drums and the like, or even a thicker film of the polymeric recording medium itself than needed to form an image will suffice.

The recording medium is the polymer film layer which is capable of retaining the "images" or marks which are used to reproduce a signal, preferably a digital signal. The unique properties of the recording medium and process are based on the ability of the polymer which constitutes the recording medium to selectively and reversibly crystallize to an optically different form in a single step. The process can operate beginning with the polymer of the recording medium in a crystalline or an amorphous phase. The polymer is most preferably in the form of a film. In either case, opaque (white), birefringent images are produced on films that were initially transparent and optically clear. The films possess all the mechanical advantages of polymeric materials, in particular the combination of rigidity, toughness, fatigue and tear resistance, abrasion resistance, low thermal expansivity, durability and flexibility.

Images smaller than one micron have been obtained using available lithographic imaging equipment. The ultimate limit of resolution is not known at this time, but it is believed to be as good as 0.1 micron. This belief is based on the knowledge that the basic crystal entity, the spherulite, can be significantly less than $0.1\mu$ in size. By this invention, image definition is controlled by the fineness of the polymer spherulite. The resolution obtained by this invention is superior to that which would be expected from the concepts underlying conventional practice, namely small wavelengths (e.g., UV and far UV) are necessary to obtain submicron images. In addition, the thermal process of this invention provides a reversible image which is not usually possible with the ablative UV based mechanisms.

A unique and significant feature of the process is the reversibility of the imaging, whereby the mark is removed and the film returned to its original, optically clear, condition. The polymers utilized have in common the following necessary combination of properties—(i) a glass transition temperature that is higher than room temperature, (ii) a crystalline melting temperature that is at least 50° higher than the glass transition temperature, (iii) a capacity for crystallizing to an extent sufficient to enable optical detection, (iv) crystallization kinetic behavior enabling the material to be obtained and maintained indefinitely in the amorphous state, and (v) thermal properties and crystallization rates and temperature dependencies such that crystallization can be effected by localized heating without crystallization spreading to regions not directly heated. The glass transition temperature is higher than the room temperature and most preferably higher than human operating conditions (desert environment to artic environment). The crystalline melting temperature meets similar conditions. The capacity for crystallizing causes an optical change which is sufficent to enable optical detection. If the amorphous to crystalline phase change is employed (whereby the film is initially amorphous), the crystallization kinetic behavior of the polymer must enable the material to be obtained and maintained indefinitely in the amorphous state. If, alternatively, the crystalline to amorphous phase change is being employed (whereby the film is initially crystalline), the polymer must be capable of being cooled sufficiently rapidly in the locally heated areas so that the amorphous features imparted to it are maintained after the radiation is turned off. It can be appreciated by those skilled in the art that crystallizable polymers that can be obtained in the amorphous state are expected to be those that can be cooled sufficiently rapidly; hence, the requirements for either of these two approaches (amorphous to crystalline or crystalline to amorphous) will be met by the same polymeric materials. Polymers known to possess the necessary combination of properties are poly(ethylene terephthalate) (PET), poly(aryl-ether-etherketone) (PEEK), and isotactic polystyrene (IPS). PET and PEEK are the more preferred recording media.

The polymers of this invention are superior to RYTON®, poly(phenylene sulfide), as optical storage media. The reasons for the better resolution involve the kinetics of the heat transfer from irradiated to masked regions, and the details of the crystallization process and its temperature dependence.

In one embodiment, the recording layer is an amorphous film of the polymer. Amorphous sheets of undoped polymer are formed by quenching from the melt by any of several known processes. Examples include compression or transfer molding followed by a rapid quenching of the mold, or extrusion through a die onto a cold "chill" roll. In another embodiment, the recording layer is a crystallized film of the polymer.

There is no limit on the thickness of the recording layer as long as there is sufficient film to have a perceivable contrast between the phases. Films as thick as 1000$\mu$ have been used. As a practical matter, no upper limit on film thickness is envisioned. The thickness can vary with the "handling properties" of the particular polymer used and are easily determined by persons familiar with these polymers in film form. Obviously, utilization of the polymeric material comprising the recording medium as the substrate will influence the choice of thickness.

The images are generated by exposing predetermined parts of the polymer to heat producing radiation of 9$\mu$ to 11$\mu$ in wavelength. The exact power needed to affect a mark on the surface will vary from polymer to polymer. Markings can be accomplished with powers in the range of 100 to 3000 mw/cm$^2$. To date, typically 800 mw/cm$^2$ from a $CO_2$ laser for writing on PET and 1400 mw/cm$^2$ for writing on PEEK, have been employed.

In the amorphous to crystalline phase change embodiment, the light is impinged onto the amorphous film for approximately 1 to 50 seconds. Most preferred is about 10 seconds. In the crystalline to amorphous phase change embodiment, the light is impinged onto the crystalline film for somewhat longer times, typically 5 to 100 seconds since the phase change commences at a higher temperature. The irradiation time of course is dependent on the power level chosen, higher power levels permitting shorter irradiation times. PEEK requires approximately 75% higher incident intensities than does PET.

Figure 2:
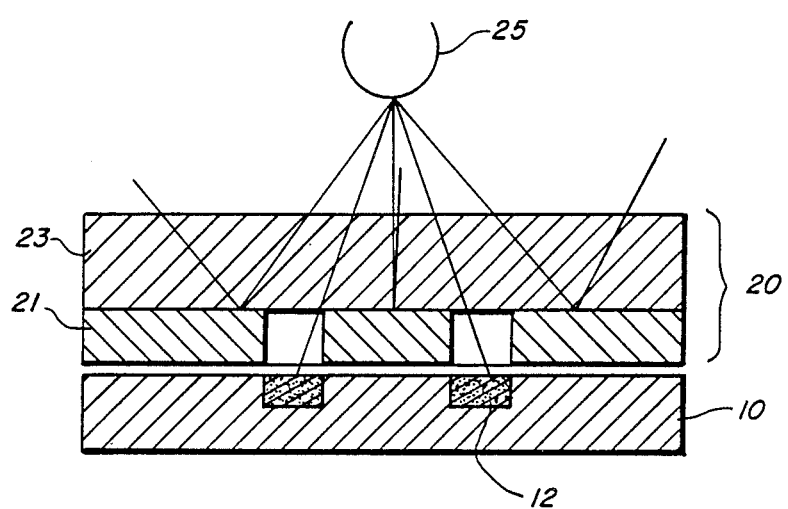
FIG. 2 is a representation of the invention wherein the pattern is created by a mask in contact with the data storage medium.

In theory, the plasticizing of the chains by this heating enables them to diffuse to the more thermodynamically stable conformations associated with the crystal state. The low interchain interactions in these polymers and the particular temperature dependence of the crystal nucleation and growth rate prevent the surrounding non-irradiated regions from being affected. When a mask is employed, as illustrated in FIG. 2, which is in contact with the polymer during the irradiation, the mask functions as a heat sink. The regions not directly exposed to the radiation are kept cooler by virtue of their contact with the mask.

Variations on the basic procedure can be utilized. These include the incorporation of dyes in the polymer to enhance the efficiency of the process and to provide improved contrast between signal and background. In addition, residual strain or nucleating agents can be incorporated to reduce the power requirements necessary to induce the phase transition. Polymer molecular weights can be varied resulting in variations in crystallization response, as are well known to those skilled in the art.

Practice of the invention can start with the recording medium in crystalline or amorphous stage. For the latter, a heat beam, with power in the range of 100 to 3000 mw/cm$^2$, impinging on the polymer in the amorphous phase causes the polymer to pass through the glass transition temperature into a temperature region in which a crystalline phase develops. Alternatively, the heat beam impinging on the polymer in the crystalline phase causes it to pass through the melting temperature whereupon it converts to an amorphous phase. Because of both the slow heat transmission properties of the polymer and the temperature dependence of its phase change kinetics, the surrounding material is not substantially affected. The affected area, such as indicated by 12 in FIG. 1, cools retaining the phase constituting the optical mark. A readable mark is left in the recording medium. Reheating can cause a change back to the original phase (i.e., erasure).

In use, information is written on the recording medium by the impingement on the medium of a heat source, such as a radiant infrared heater, a heated stylus, or preferably a laser source such as a $CO_2$ laser. This could be a direct impingement and writing by movement of the source or, alternately, by projection of a pattern through a mask or combinations of masks.

FIG. 2 illustrates the use of a mask 20. In the embodiment illustrated in FIG. 2., the mask 20 is in contact with the surface of the optical recording medium (disk) 10. The mask 20 comprises a support 23 of material transmissive to the radiation to be employed. A patterned layer 21 is on the lower surface of the support 23. Predetermined openings 22 form a pattern in the layer 21.

Heat from the laser source 25 is projected through 23 and the openings 22 to form an image 12 in the disk 10. This image can be instantly read by the usual means for reading optically stored information.

The image 12 can be removed by heating the disc 10 as a whole or by projecting a heat beam of laser light onto the disk 10 and tracking the beam over the material to be erased. The erasing beam must contain sufficient energy to raise the recording medium either (i). to a temperature sufficiently past the glass transition point so that crystallization commences thereby transforming the heated zone to a crystalline phase, or (ii). to a temperature past the melting point so that crystallites are transformed in the heated zone to amorphous material.

Figure 3:
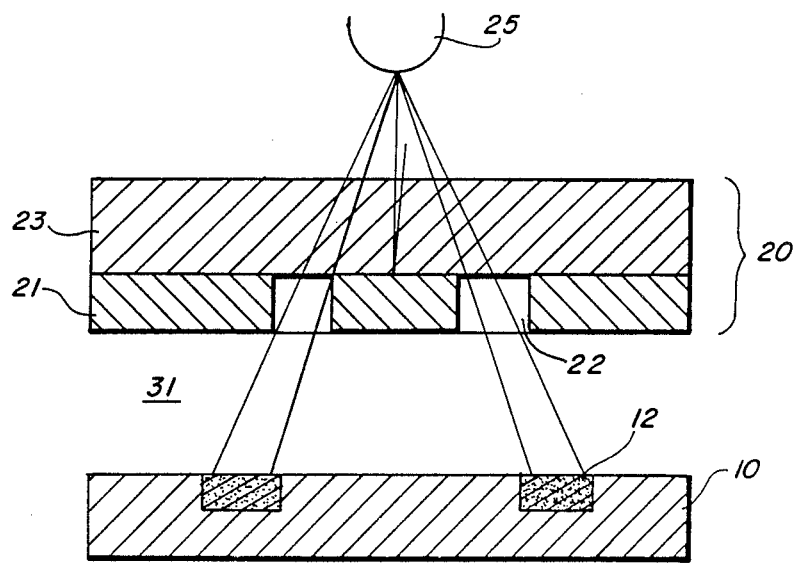
FIG. 3 is a representation of an alternate embodiment of the invention where the mask is not in contact with the medium.

In an alternate embodiment shown in FIG. 3, the mask 20 is not in contact with the disk 10. A space 31 separates the mask 20 from the disc 10. The space 31 causes some diffusion of the light coming through the openings 22.

Figure 4:
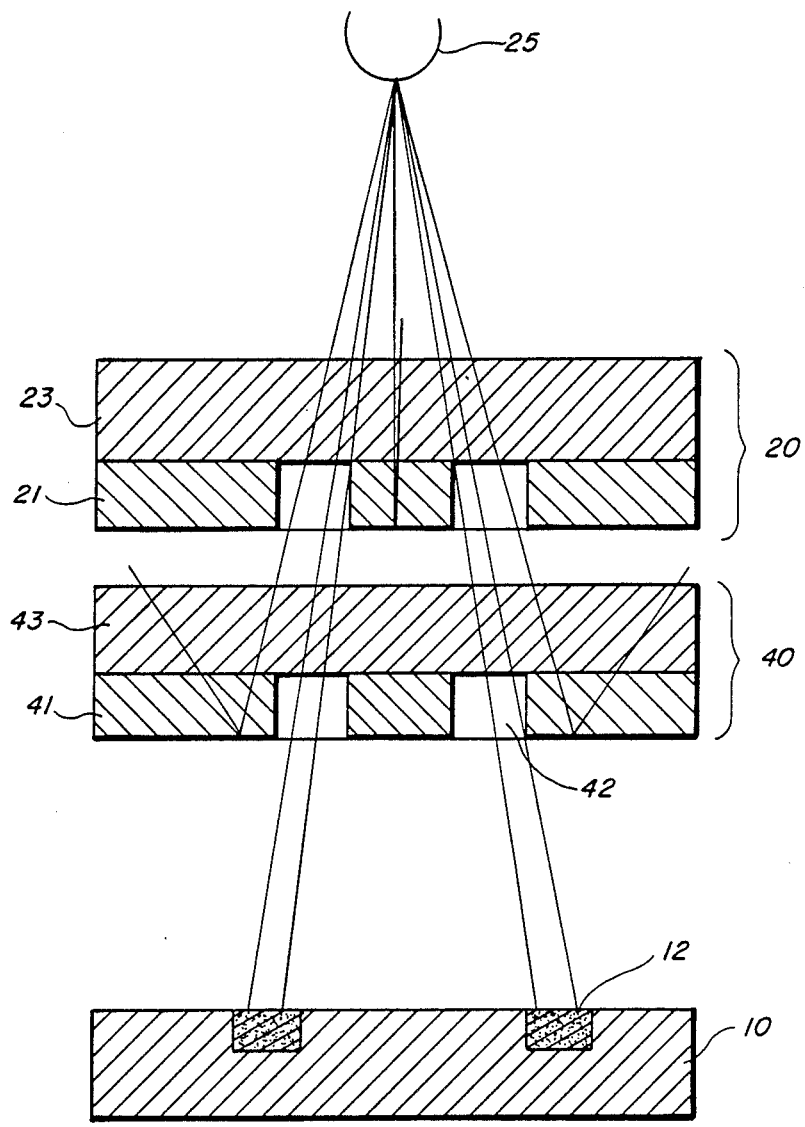
FIG. 4 is another embodiment of the invention using double masks to sharpen data imprint.

In another alternate embodiment shown in FIG. 4, a second mask 40 having a supporting layer 43, an opaque layer 41, and openings 42 is imposed between the mask 20 and the disk 10. The second mask blocks substantially all of the diffuse light scattering from the first mask causing a sharper image 12.

Having described the invention, the following examples are given to illustrate specific applications of the invention including the best mode now known to perform the invention. These specific examples are not intended to limit the scope of the invention described in this application.

EXAMPLES 1

Amorphous PET film, 0.005 inch thick, was irradiated through a light field gold on GaAs mask for 20 s at 1.8 watts CW (a continuous wave, not pulsed, laser). The metallized side of the mask was in physical contact with the film. The mask consisted of 100 micron boxes (not gold coated) separated by 100 micron spaces (gold coated). Images obtained on the PET film were of the same number and size as seen on the mask. They appeared white to the naked eye, brown against a white background under optical magnification, white against a dark background when inspected between crossed polarizers, and light blue against a dark blue background when inspected under fluorescent light. Slight crystallization was observed to partially obscure some areas between large figures that were close together.

EXAMPLE 2

Pet film, 0.005 inch thick, was irradiated through a dark field gold on GaAs mask for 20 s at 1.2 watts CW. The gold coated side of the mask was in physical contact with the film. The mask consisted of 100 micron boxes and circles (gold coated) separated by 100 micron spaces (not gold coated). Images obtained were of the same size and number as on the mask. The images were usually amorphous, or sometimes only slightly crystalline, features against a highly crystalline field.

EXAMPLE 3

Experiment similar to that of example 1 except that the mask was raised progressively off of the film (i.e., there was an air gap between the mask and the polymer). Images similar to those seen in 1 were obtained. However, there was more obfuscation of the areas between crystalline images due to scattered light impinging on the unprotected surfaces. As the air gap was increased, the scattering from the edge (that is, border of the gold coating) falls over a broader region, so that heating of regions not directly irradiated is lessened; however, the "heat sink" effect is lost when any air gap is introduced.

EXAMPLE 4

Experiment similar to example 1 except that shadow masks of 700 micron and 350 micron features and 700 and 350 micron spaces were used. These masks are made of aluminum with machined holes which allowed the light to impinge directly on the film surface. When these masks were in contact with the film and the light allowed to heat the film, clear and concise crystalline images were produced on the film surface. As the mask was raised, the features became progressively more obscured by crystallization of the dark regions due to scattered light from the mask. When the mask was far enough away, the scattered light intensity was low enough that its amplitude was insufficient to cause crystallization. At this point (ca. 6" from film surface for this particular mask with a laser beam of this particular collimation) the crystalline images were again observed nearly free of crystallinity in the spaces between the images.

EXAMPLE 5

Experiments similar to example 1 except that a shadow mask with spaces from 75 to 125 microns, in contact with film, was used. Good quality images resulted.

EXAMPLE 6

One watt of $CO_2$ laser light was allowed to reflect off a surface positioned near the 0.005 inch thick PET film for 30 sec. By employing reflected light, the diffuse edge scattering that hindered resolution in examples 3 and 4 was avoided. Fine crystalline lines were observed, with a width of 1 micron, separated by varying distances of between 5 and 25 microns. Acuity was very good.

EXAMPLE 7

Amorphous PEEK film. (0.003 inch thick) was irradiated through a light field mask at 3 watts CW power for 20 s. The mask was similar to that in example 1 with the addition of 25 micron circles. Crystalline images were obtained as in example 1, along with 25 micron circles appearing white against an amber background (to the naked eye), and white against a black background when viewed through crossed polarizers.

EXAMPLE 8

Isotactic polystyrene film was prepared by quenching from the melt to an amorphous state. The film was 0.007 inches thick on average. Exposure to 1 watt CW laser radiation for 10 s with no intervening mask produced a small crystalline spot appearing white against a transparent background. This spot had a spatial profile coinciding with that of the laser beam (which appeared as a hollow disk with an central spot when projected on a screen).

Obviously, many modifications and variations of the present invention are possible in light of the above teachings. It is therefore to be understood that, within the scope of the appended claims, the invention may be practiced otherwise than as specifically described.

What is claimed is:

1. An optical storage medium comprising a substrate, and a recording medium on said substrate, wherein said recording medium is comprised of a polymer having the following combination of properties—(i) a glass transition temperature that is higher than room temperature, (ii) a crystalline melting temperature that is at least 50° higher than the glass transition temperature, (iii) a capacity for crystallizing to an extent sufficient to enable optical detection, (iv) crystallization kinetic behavior enabling the material to be obtained and maintained indefinitely in the amorphous state, and (v) thermal properties and crystallization rates and temperature dependencies such that crystallization can be effected by localized heating without crystallization spreading to regions not directly heated.

2. An optical storage medium according to claim 1 wherein the substrate and recording medium are the same polymeric material.

3. An optical storage medium according to claim 1 wherein the recording medium is protected by a protective layer of an optically clear protective covering.

4. An optical storage medium according to claim 3 wherein the recording medium and the protective layer is formed from the same polymeric material.

5. An optical storage medium according to claim 3 wherein the recording medium, the substrate and the protective layer is formed from the same polymeric material.

6. An optical storage medium according to claim 1 wherein the recording medium is selected from the group consisting of poly(ethyleneterephtalate) (PET), poly(aryl-ether-ether-ketone) (PEEK), and isotactic polystyrene (IPS).

7. An optical storage medium according to claim 2 wherein the recording medium is selected from the group consisting of poly(ethyleneterephtalate) (PET), poly(aryl-ether-ether-ketone) (PEEK), and isotactic polystyrene (IPS).

8. An optical storage medium according to claim 3 wherein the recording medium is selected from the group consisting of poly(ethyleneterephtalate) (PET), poly(aryl-ether-ether-ketone) (PEEK), and isotactic polystyrene (IPS).

9. An optical storage medium according to claim 5 wherein the recording medium is selected from the group consisting of poly(ethyleneterephtalate) (PET), poly(aryl-ether-ether-ketone) (PEEK), and isotactic polystyrene (IPS).

10. An optical storage medium according to claim 6 wherein the recording medium is poly(ethyleneterephthalate).

11. An optical storage medium according to claim 7 wherein the recording medium is poly(ethyleneterephthalate).

12. An optical storage medium according to claim 8 wherein the recording medium is poly(ethyleneterephthalate).

13. An optical storage medium according to claim 9 wherein the recording medium is poly(ethyleneterephthalate).

14. An optical storage medium according to claim 6 wherein the recording medium is polyaryletheretherketone.

15. An optical storage medium according to claim 7 wherein the recording medium is polyaryletheretherketone.

16. An optical storage medium according to claim 8 wherein the recording medium is polyaryletheretherketone.

17. An optical storage medium according to claim 9 wherein the recording medium is polyaryletheretherketone.

18. An optical storage medium according to claim 6 wherein the recording medium is isotactic polystyrene.

19. An optical storage medium according to claim 7 wherein the recording medium is isotactic polystyrene.

20. An optical storage medium according to claim 8 wherein the recording medium is isotactic polystyrene.

21. An optical storage medium according to claim 9 wherein the recording medium is isotactic polystyrene.

22. A process of forming an erasable image on an optical storage medium comprising
exposing a recording medium consisting of an initially amorphous, optically clear polymeric film to infrared radiation in a predetermined area, causing a local heating of the film sufficient to transform the polymer to the crystalline state.

23. A process of forming an erasable image on an optical storage medium comprising
exposing an initially crystalline, optically opaque or birefringent polymeric film to infrared radiation to effect local heating of the film said heating being sufficient to effect a local transformation of the polymer to the amorphous state,
halting the irradiation,
cooling said film sufficently to reduce the temperature of the heated area of the film below the glass transition temperature of the polymer without recrystallizing.

24. The process described in claim 22 wherein the film consists of poly(ethyleneterephthalate).

25. The process described in claim 23 wherein the film consists of poly(ethyleneterephthalate).

26. The process described in claim 22 wherein the film consists of polyaryletheretherketone.

27. The process described in claim 23 wherein the film consists of polyaryletheretherketone.

28. The process described in claim 22 wherein the film consists of isotactic polystyrene.

29. The process described in claim 23 wherein the film consists of isotactic polystyrene.

* * * * *